United States Patent
Choi

(10) Patent No.: US 7,398,887 B2
(45) Date of Patent: Jul. 15, 2008

(54) PRODUCT AND METHOD OF FORMING SUCCESSIVE LAYERS OF FACE-TO-FACE ADJACENT MEDIA WITH CALCULATED PORE SIZE

(75) Inventor: Kyung-Ju Choi, Louisville, KY (US)

(73) Assignee: AAF-McQuay, Inc., Louisville, KY (US)

( * ) Notice: Subject to any disclaimer, the term of this patent is extended or adjusted under 35 U.S.C. 154(b) by 370 days.

(21) Appl. No.: 11/006,429

(22) Filed: Dec. 7, 2004

(65) Prior Publication Data
US 2005/0139543 A1    Jun. 30, 2005

Related U.S. Application Data

(63) Continuation-in-part of application No. 09/781,786, filed on Feb. 12, 2001, now abandoned.

(51) Int. Cl.
*B01D 39/14* (2006.01)
(52) U.S. Cl. .................. 210/491; 210/496; 210/508; 55/487
(58) Field of Classification Search ......... 210/488–491, 210/508; 55/486–488
See application file for complete search history.

(56) References Cited

U.S. PATENT DOCUMENTS

| 4,093,437 | A | * | 6/1978 | Ichihara et al. ............... 55/487 |
| 4,322,385 | A | * | 3/1982 | Goetz ........................ 422/165 |
| 4,589,983 | A | * | 5/1986 | Wydevan .................... 210/317 |
| 4,661,255 | A | * | 4/1987 | Aumann et al. ............. 210/491 |
| 4,732,675 | A | * | 3/1988 | Badolato et al. ............ 210/314 |
| 5,082,476 | A | * | 1/1992 | Kahlbaugh et al. ........... 95/287 |
| 5,275,743 | A | * | 1/1994 | Miller et al. ................ 210/767 |
| 5,480,464 | A | * | 1/1996 | De Villiers et al. ............ 55/320 |
| 5,800,586 | A | * | 9/1998 | Cusick et al. ................. 55/486 |
| 5,858,045 | A | * | 1/1999 | Stemmer et al. .............. 55/486 |
| 5,968,373 | A | * | 10/1999 | Choi ......................... 210/806 |

OTHER PUBLICATIONS

"Air Permeability and Pore Distribution of a Dual-Layered Microglass Filter Medium", vol. 6 of Advances in filtration and Separation Technology of the AFS Society 97-99 (1994).*

* cited by examiner

*Primary Examiner*—Terry K Cecil
(74) *Attorney, Agent, or Firm*—James E. Cole; Middleton Reutlinger

(57) ABSTRACT

A filter media product and method of making the same wherein at least two independent filter media thicknesses of differing coarse and fine pore sizes are held in face-to-face relationship with the pore sizes being so calculated that the overall average pore size of successive thicknesses is smaller than the pore size of the finest fiber thickness.

12 Claims, 3 Drawing Sheets

PRODUCT AND METHOD OF FORMING SUCCESSIVE LAYERS OF FACE-TO-FACE ADJACENT MEDIA WITH CALCULATED PORE SIZE

CROSS-REFERENCE TO RELATED APPLICATIONS

This application is a continuation-in-part application of and claims priority to and benefit from, currently pending, U.S. patent application Ser. No. 09/781,786, which was filed Feb. 12, 2001 now abandoned.

STATEMENT REGARDING FEDERALLY SPONSORED RESEARCH OR DEVELOPMENT

Not applicable.

BACKGROUND OF THE INVENTION

The present invention relates to multi-layered filter media and more particularly to a unique and novel arrangement for further improving the construction and particulate removal performance efficiency of multi-layered filter media.

The present invention comprises still another efficient and economical layered filter media arrangement such as disclosed in recently issued U.S. Pat. No. 5,968,373, issued to Kyung-Ju Choi on Oct. 19, 1999, in which issued patent 'there was included spacer filter arrangements to provide a through-flow void space for fractionated distribution of particles between successive spaced layers of filter media so as to maximize particulate holding capacity of an overall filter arrangement.

As noted in above U.S. Pat. No. 5,968,373, it has been long known in the filtration art to separate particulate material from a particulate-laden fluid stream by passing such fluid stream at a given face velocity through a variable density sheet of filter media of a preselected face area with the density of the filter media increasing from the upstream face of the filter media toward the downstream face of the filter media. Or, in other words, the porosity of the filter media has been greater adjacent the upstream face of the media so as to capture the larger size particulate materials from a fluid stream to be treated and to then capture the smaller size particulate materials adjacent the downstream face of the filter media. The prior art also has recognized that such a filtration function can be accomplished with the utilization of successively or immediately layered sheets of filter media, the resulting filter media being of preselected increasing density and of finer or smaller porosity from upstream to downstream face of the layered facing sheets of filter media.

In this regard, attention is directed to U.S. Pat. No. 5,082,476, issued to B. E. Kalbaugh, et al. on Jan. 21, 1992, and U.S. Pat. No. 5,275,743, issued to J. D. Miller, et al, both of which patents teach more recent arrangements of immediate filter media layering, attentions further directed to U.S. Pat. No. 4,661,255 and also as set forth in above U.S. Pat. No. 5,968,373, issued to G. Aumann, et al, on Apr. 28, 1987, and to U.S. Pat. No. 4,732,675, issued to A. Badolato, et al, on Mar. 22, 1988, both of which patents teach multi-layered filter media of varying density but which also fail to recognize the inventive features set forth herein, let alone provide a unique apparatus and method to accomplish the novel arrangement herein described. Further, attention is directed to the additional patents made of record in the above U.S. Pat. No. 5,968,373, which teach additional filter media arrangements but which failed to anticipate the invention of U.S. Pat. No. 5,968,373 and which also fail to anticipate the novel filter media arrangement set forth herein. These additional patents are: U.S. Pat. Nos. 4,322,385, issued to G. W. Goetz on Mar. 30, 1982; 4,589,983, issued to R. M. Wydeven on May 20, 1986; and, 5,858,045, issued to M. J. Stemmer et al on Jan. 12, 1999.

Finally, as in above U.S. Pat. No. 5,968,373, attention is directed to several bullets of interest relating to pore size characteristics: namely, ASTM, Designation F3 16-86, published Apr. 1986 and entitled, "PORE SIZE CHARACTERISTICS OF MEMBRANE FILTERS BY BUBBLE POINT AND MEAN FLOW PORE TEST"; Advances in Filtration and Separation Technology", Vol. 8, AFS Society pp. 97-99 (1994), entitled, "AIR PERMEABILITY AND PORE DISTRIBUTION OF A DUAL-LAYERED MICROGLASS FILTER MEDIUM", by Kyung-Ju Choi; Fluid Particle Separation Journal, Vol. 7, No. 1, Mar. 1994 entitled, "PORE DISTRIBUTION AND PERMEABILITY OF CELLULOSIC FILTRATION MEDIA", by Kyung-Ju Choi; TAPPI 1995 non-woven conference, pp. 44-50, entitled, "PERMEABILITY PORE SIZE RELATIONSHIP OF NON-WOVEN FILTER MEDIA", by Kyung-Ju Choi; INJ., Vol. 6, No. 3, pp. 62-63, 1994 entitled, "PREDICTION OF AIR PERMEABILITY AND PORE DISTRIBUTION OF MULTI-LAYERED NON-WOVENS"., by Kyung-Ju Choi; and, FLUID PARTICLE SEPARATION JOURNAL, Vol. 9, No. 2, Jun. 1996, pp. 136-146, entitled, "FLUID FLOW THROUGH FILTER MEDIA AT A GIVEN DIFERENTIAL PRESSURE ACROSS MEDIA", by Kyung-Ju Choi.

The present invention, further recognizing the filtration performance limitations of past filter medium arrangements, as well as the reasons therefore, provides a further unique and novel filter media arrangement involving a novel product and method which does not include the more costly and time consuming selective spacing of past arrangements to further optimize filtration efficiency and capacity of a novel product in an even more straight forward and economical manner than in past filter media arrangements, all being accomplished by the present invention in a straight forward and economical manner, requiring a minimum of additional parts and operating steps to accomplish the same. In effect, the present invention provides a unified filter media product and method of manufacturing the same, which achieves effective particle capture and long life to optimize filtration performance.

In accordance with the present invention, it has been recognized that there is a critical need in the fluid filtration art to provide filtration media with extended life and with finer particle filtration capabilities. In the past and as can be seen in the afore discussion of prior art, to achieve effective particle capture and long filtration life, the multi-layered filter media concept has been generally accepted in the filtration market. To design multi-layered filtration media so as to improve filtration performance, extensive research and development has been required in the past due to the complexity of variables associated with the combination of filtration media layers.

To minimize the research and development, the present invention recognizes and has found it expedient to utilize a comparatively straightforward and novel equation which can be utilized with novel filtration media whether the media is comprised of a single layer of varying face-to-face thicknesses or a plurality of face-to-face layers, each of selected thickness. Given filtration characteristics such as mean flow pore size, pore size distribution, permeability, mean fiber size, porosity defined as pore volume over total volume and dust loading characteristics of individual thickness, filtration characteristics of combined media thicknesses can be calculated in accordance with the present invention by utilizing the unique and novel formula set forth hereinafter. Pursuant to the present invention, selected filtration media characteristics of combined filter media thicknesses—whether the thicknesses are in face-to-face thicknesses in single layer form or in multiple face-to-face layers of thicknesses—which filtration characteristics are superior to the filtration characteristics of individual filter media thicknesses when utilizing the inventive filter media formula hereinafter set forth.

Various other features of the present invention will become obvious to one skilled in the art upon reading the disclosure set forth herein.

BRIEF SUMMARY OF THE INVENTION

More particularly, the present invention provides a multi-thickness filter media comprising a combination of at least two successive adjacent face-to-face thicknesses of carded filter media with chopped fibers having a combination of different denier fibers, so that the pore size characteristics of one thickness differs from that of an adjacent thickness with the different combination of fiber sizes of one thickness being comparatively finer than the fibers of the other thickness and with the different combination of fiber sizes and pore sizes of the successive adjacent face-to-face thicknesses being calculated so that the overall average pore size of the combined successive face-to-face thicknesses is smaller than the pore size characteristics of the finest fiber thickness in order to optimize filtration efficiency and capacity.

Further, the present invention provides a unified method of manufacturing such filter media comprising: collecting a first measured weight of chopped fibers in a hopper-collector zone, the first measured weight of chopped fibers being of selected combination of fibers and pore sizes; collecting at least a second measured weight of chopped fibers in a hopper collector zone to be successively joined in overlying face-to-face relation with the first measured weight of chopped fibers, the second measured weight of chopped fibers being of selected combination of fibers and pore sizes different from the fibers and pore sizes of the first measured weight of chopped fibers with the combination of fibers of one thickness being finer than that of fibers of the other thickness; passing the first and second measured weights to a carding zone to open and align the chopped fibers in each thickness, the successively joined filter thicknesses having face-to-face relationship to maximize particulate filtration efficiency and capacity with the overall average pore size and permeability of the combined successive face-to-face thicknesses being smaller than pore size and permeability of that thickness with the finest fiber to optimize filtration performance.

It is to be understood that various changes can be made by one skilled in the art in one or more of the several parts and in one or more of the several steps in the apparatus and method disclosed herein without departing from the scope or spirit of the present invention. For example, filter media layers of different materials and different preselected pore sizes compatible with the principles taught herein can be utilized without departing from the scope or spirit of the present invention.

DETAILED DESCRIPTION OF THE INVENTION

Figure 1A:
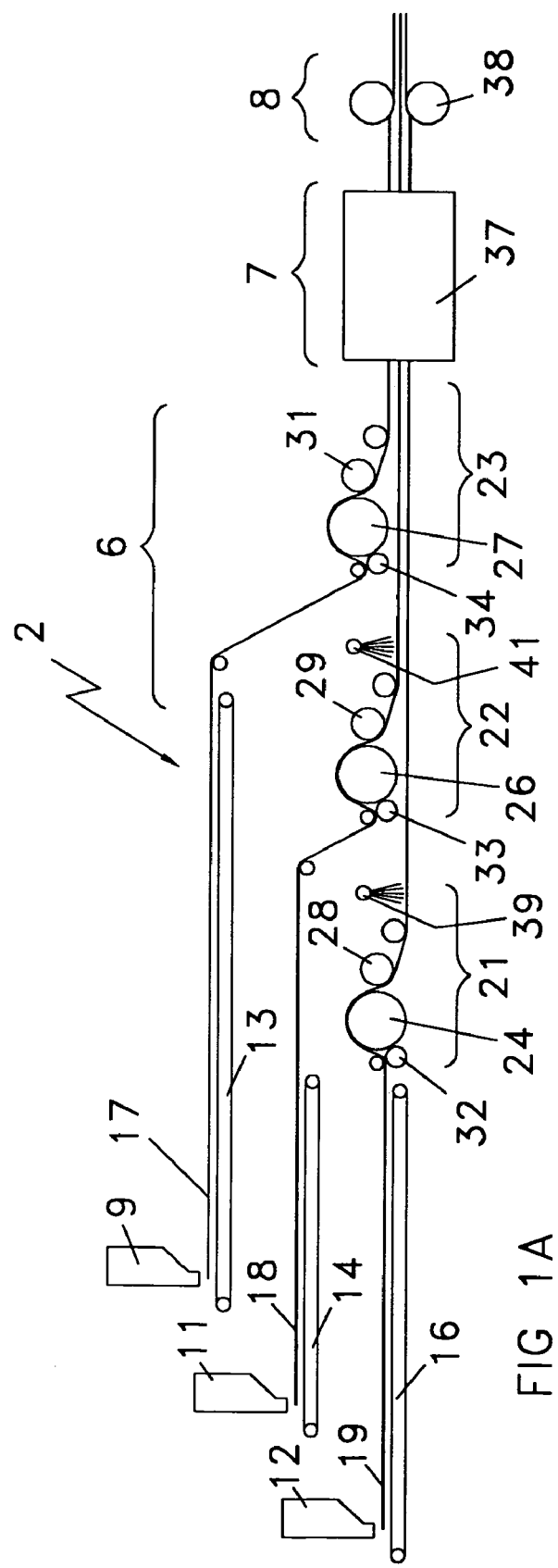
FIG. 1A is a side elevational view of a schematic flow diagram of equipment arranged to carry out the novel steps of the present invention to produce the unified novel carded filter media product herein described.
Figure 1B:
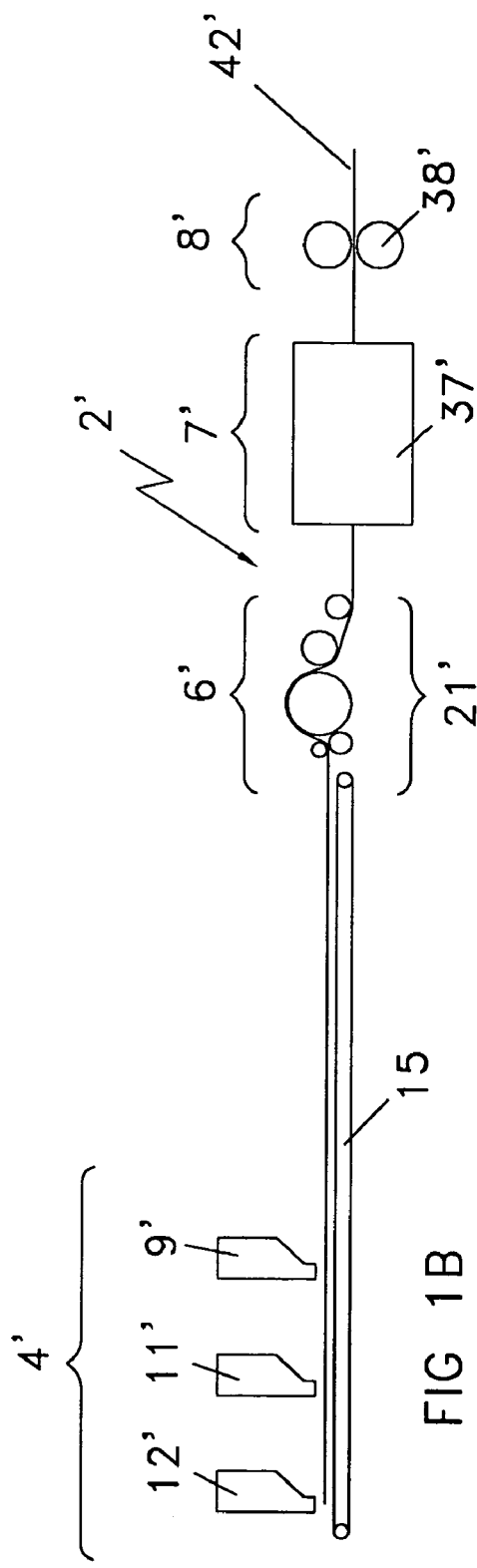
FIG. 1B discloses a variation in the fiber mixer-blender section of FIG. 1A utilizing a single in-line endless belt under spaced aligned tie mixer-blenders to provide integral filter media.
Figure 2:
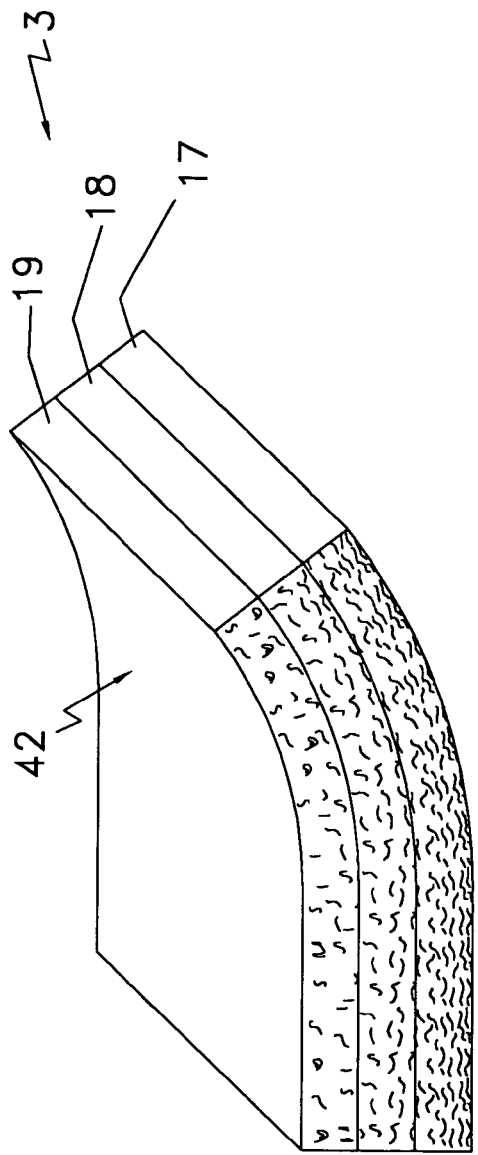
FIG. 2 is an isometric cross-sectional view of a face-to-face layered thicknesses carded filter media portion of the novel carded filter media product, which can be produced in accordance with the schematic flow diagram of FIG. 1A.
Figure 3:
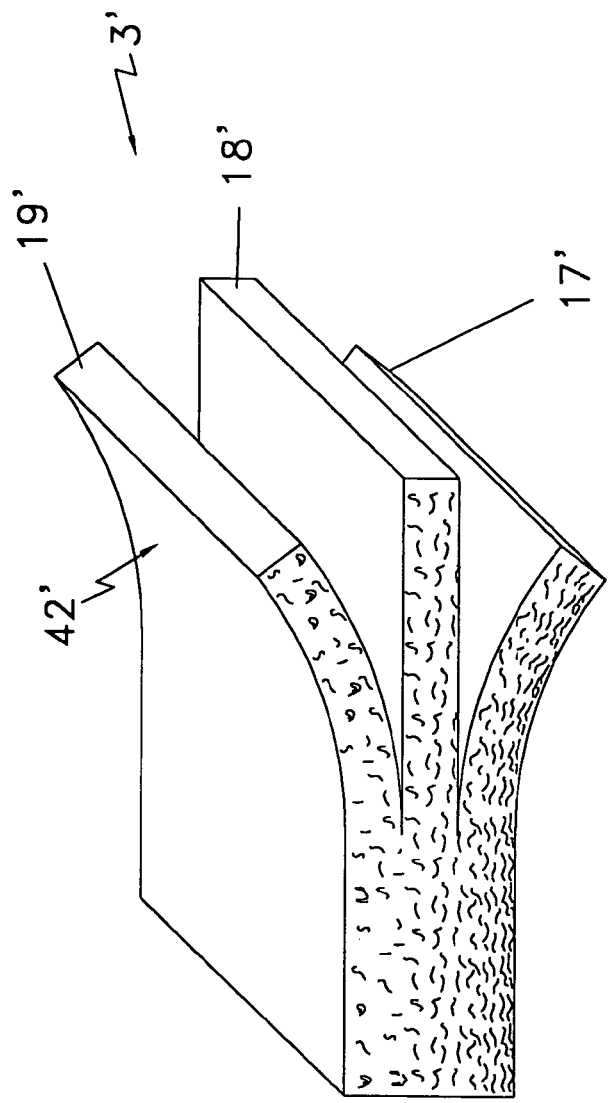
FIG. 3 is an isometric cross-sectional view similar to the view of FIG. 2, but of an integral face-to-face thicknesses filter media portion of the navel carded filter media product which can be produced in accordance with the flow diagram of FIG. 1B; and, FIG. 4 is a schematic pore diagram illustrating the advantages of the present invention with the plotting of course, fine and inventively experimental and calculated combined layers with the vertical Y-axis representing the percentage (%) number of pores and the horizontal X-axis representing the pore sizes (micrometer).

Referring specifically to FIG. 1A and 1B of the drawings, schematic flow diagrams 2 and 2' are disclosed, these diagrams each schematically including several sections arranged successively and substantially in-line to produce the unified novel carded filter media 3 and 3' such as disclosed in FIGS. 2 and 3 respectively of the drawings. The disclosed flow-diagrams, each broadly includes four sections—namely, the bracketed mixer-blender sections 4 and 4', the bracketed carding sections 6 and 6', the bracketed heating sections 7 and 7' and the bracketed calendering sections 8 and 8'. Mixer-blender section 4, as shown FIG. 1A, discloses three spaced mixer-blenders 9, 11 and 12. These mixer-blenders 9, 11 and 12 can be arranged with the outlets at different spaced levels to feed well blended chopped fibers of selected sizes to endless collector belts 13, 14 and 16, respectively spaced at different selected levels to cooperate respectfully with the outlets of mixer-blenders 9, 11 and 12. 'Spaced belts 17, 18 and 19 of selected thickness layers of well blended chopped fiber filter media mats are formed respectively on endless collector belts 13, 14 and 16 and are passed to the carding section 6. In a manner generally known in the art and not shown herein, chopped fibers measuring approximately one half (½) inches to one and two (2) inches in length of selected coarse to fine deniers, as determined in accordance with the present invention described hereinafter are passed to mixer-blenders 9, 11, and 12, respectively, from hopper feeders, beater openers, conveyor fans, fine openers and vibra feeders. In accordance with the present invention and based on environmental conditions the fibers fed to mixer-blenders 9, 11 and 12 can be of several combinations of coarse fibers, intermediate fibers and fine fiber layers. For example, when two layers of media are involved combinations of either coarse fibers and intermediate or fine fibers or even intermediate and fine fibers can be employed. When three layers of media are involved combinations of coarse fibers, intermediate fibers, and fine fibers can be employed. A "coarse media" layer of selected thickness with all fibers measuring approximately between one to two (1-2) inches in fiber length advantageously is considered to be of approximately thirty (30) percent fifteen (15) denier fibers, of approximately thirty (30) percent six (6) denier fibers and of approximately forty (40) percent of six (6) denier low melt fibers. An "intermediate media" layer with all fibers measuring approximately between one-half to two (½-2) inches in fiber length advantageously is considered to be of approximately forty (40) percent six (6) denier fibers, of ten (10) percent three (3) denier fibers and fifty (50) percent four (4) denier low melt fibers. A "fine media" layer with all fibers measuring approximately between one half to two (½-2) inches in fiber length advantageously is considered to be of approximately forty (40) percent three (3) denier fibers, ten (10) percent one (1) denier fibers and fifty (50) percent two (2) denier low melt fibers. In the carding section 6 of FIG. 1A, three spaced carding roll assemblies 21, 22 and 23 are shown. Each assembly includes a spaced main carding roll 24, 26, and 27, respectively, with each having a cooperating smaller semi-random carding roll 28, 29 and 31, respectively. Suitable guide roll sets 32, 33 and 34, respectively, are provided with each carding roll assembly 21, 22 and 23 respectively to insure that the spaced carded fibrous filter media belts are properly passed in spaced alignment to heating section 7 and through the spaced open-ended heating oven 37 and spaced calendering section 8 which includes the cooperating spaced upper and lower calendering rolls 38.

It is to be noted that between spaced carding roll assemblies 21 and 22 and spaced carding roll assemblies 21, 22 and 23, suitable spray mechanisms 39, 41 and 43 can be provided to spray an appropriately selected binder agent such as an acrylic binder (either hydrophilic or hydrophobic) unto the upper surface of the carded mat therebelow or to both sides so as to bond the layers of calendered, chopped fiber mats together. In FIG. 2, a portion of the bonded layer filter media including bonded adjacent face-to-face portions of selected thicknesses of carded, chopped fiber mats 17, 18 and 19, respectively, is disclosed as layer bonded filter media 42.

Alternatively, and as disclosed in FIG. 1B and FIG. 3, the well blended carded, chopped fibers 17', 18' and 19' of selected thicknesses can be of 'integral inventively selected low melt fibrous nature with the selected thicknesses in face-to-face relation as above described and formed on a single endless belt 15 passing successively in-line under mixer-blenders 9', 11', and 12' with outlets at the same level and when passed through heating oven 37 in heating section 7, with melting characteristics advantageously in the range of approximately two hundred to four hundred (200°-400°) degrees Fahrenheit can be heat-bonded to form the integral heat bonded filter medium 42'.

It is to be understood that various alterations can be made in the flow diagram(s) of FIGS. 1A and 1B and the several sections thereof, as well as different sections added thereto by one skilled in the art without departing from the scope or spirit of the invention. For example, the chemical composition of the chopped fibers utilized can be varied, as can the number of thickness layers and thicknesses of carded fibrous media layers employed and the chemical bonding sprays. Further, the pore and fiber sizes and length of chopped fibers can be varied in designing the multi-layered filtration media to optimize filtration performance.

In accordance with the present invention, to achieve the maximum capacity it may be necessary to maintain an equal share of the terminal differential pressure on an individual layer of medium.

From Hagen-Poiseuille Law, Q may be given as:

$$Q = \frac{\pi P r^4}{8\mu L} = \frac{\Delta P(\pi r^2)^2}{\pi 8 \mu L} = \frac{\Delta P M^2}{\pi 8 \mu L} \qquad 1$$

Hence $$\text{Constant} = \frac{\Delta P_i M_i^2}{L_i} \qquad 2$$

where i=1, 2 and 3 for triple layer media and *mu* is the viscosity of fluid.

By solving Equation 2 for the double layer media:

$$\left(\frac{M_1}{M_2}\right)^2 = \frac{L_1}{L_2} \qquad 3$$

For the triple layer medium:

$$\left(\frac{M_2}{M_1 M_3}\right)^2 = \frac{L_2}{L_1 L_3} \qquad 4$$

The above equations, as indicated by numerals 3 and 4, can be used to design the multi-layer calendered, chopped fiber filter media at the initial stage of filtration. However, the pore distribution and the mean flow pore of each thickness layer and/or thicknesses changes with time and captured particles in each layer or thickness. The incoming particle distribution changes as particles pass through prior layers. Equations 3 and 4 have to be applied at the final stage of filtration or right before the terminal differential pressure. It is to be understood that each layer can be designed experimentally by installing pressure sensors between each layer so that $\Delta P = \Delta P_1 = \Delta P_2 = \Delta P_3 = \Delta P_4 \ldots$ at the termination pressure.

Figure 4:
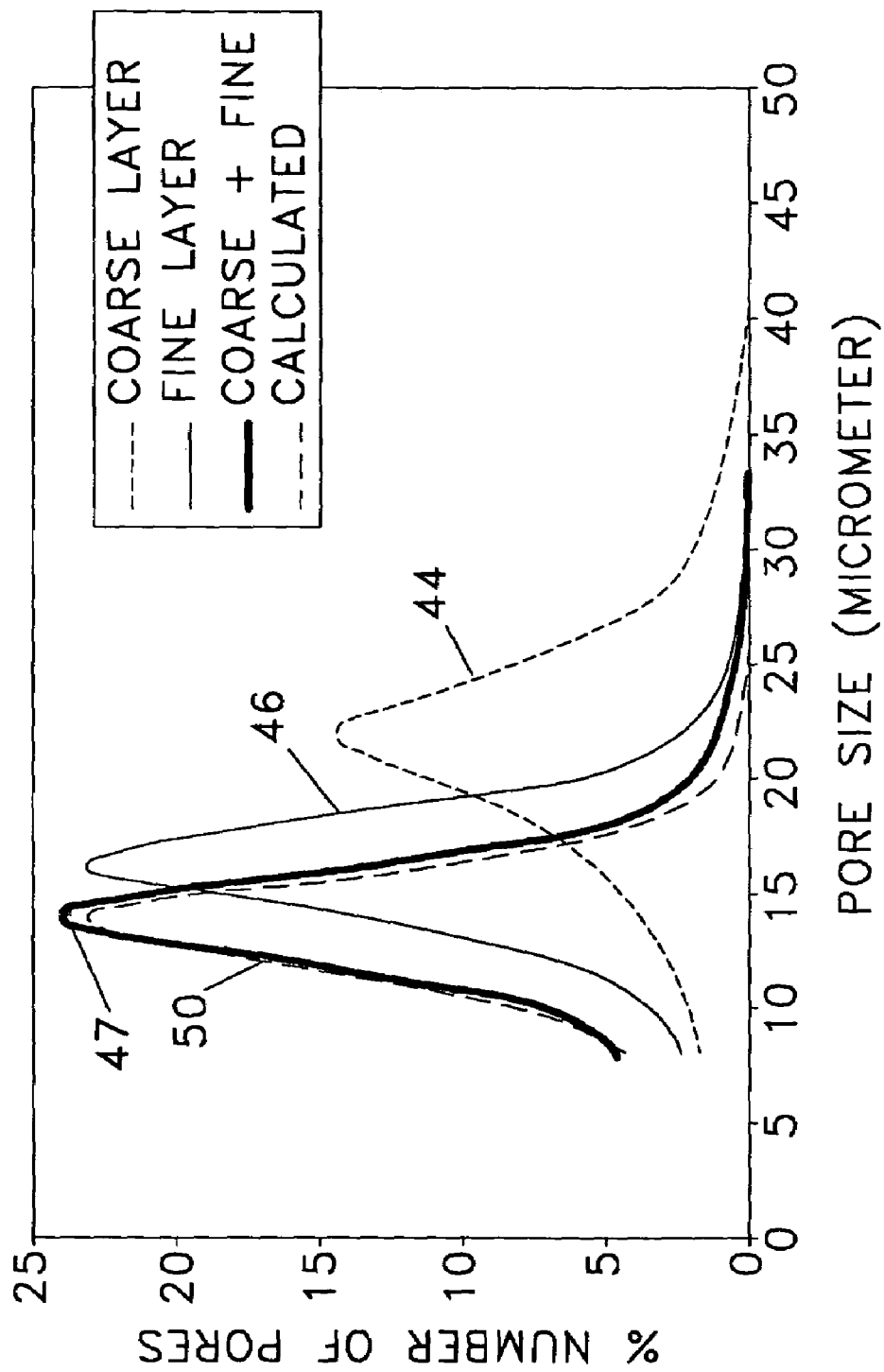

For a multi-layered, chopped fiber mats, the average pore size of such multi-layered media may be much smaller than that of the finest layer (FIG. 4). However, it may be slightly larger than predicted size because of a tortuous path ($1/\epsilon$), and the remaining parts of pores that are not used in predicted pore ($1/\epsilon$). The porosity, $\epsilon$, is the ratio of the pore volume to the total volume of media.

Hence, the average pore size of an n-layered media may be expressed as $$\frac{1}{M} = \varepsilon_i \varepsilon_{i+1} \ldots \varepsilon_n \left( \sum_{i=1}^{n} \frac{1}{M_i} \right) \qquad 5$$

where "i" is the order of the layer and "n" is the number of layers.

Likewise, the air frazier permeability of an "n"-layer medium, "v" in cfm/sq ft, may be expressed as:

$$\frac{1}{v} = \varepsilon_i \varepsilon_{i+1} \ldots \varepsilon_n \left( \sum_{i=1}^{n} \frac{1}{v_i} \right) \qquad 6$$

In a typical experiment in accordance with the present invention two polymeric air filter media were used. One was a fine layer and the other was a coarse layer. A porometer was used to measure the mean flow pore diameter and percent distribution of the number of pores.

FIG. 4 discloses a pore distribution chart illustrating on the vertical Y-axis, the percent number of pores per unit area and on the horizontal X-axis the pore size in micrometers for each of two separate layers of filter media, their combination when lin immediately facing relation. The small dotted line 44 is for the measured percent pore distribution of the coarse layer, and the weak continuous line 46 is for that of the fine layer, the dark continuous line 47 is for that of combined layers 44 and 46 in adjacent face to face relation on an experimental basis and the heavier dash line 50 represents combined layers 44 and 46 in adjacent face-to-face relation on a calculated basis.

In calculations in accordance with the present invention, $M_1$, $M_2$ and $M_3$ represent the total open area of the top, middle and bottom of three successively spaced selected thickness layers of filter media as shown in FIG. 2. $M_1$, $M_2$ and $M_3$, represent the mean flow pore size because the mean flow pore size is the average pore size. Letting $L_1$, $L_2$ and $L_3$ represent the thickness of the top, middle, and bottom layer and $\Delta P_1$, $\Delta P_2$ and $\Delta P_3$ represent the differential pressure drop across the top, middle, and bottom layer, respectively, the total pressure drop of triple layer medium would be $\Delta P = \Delta P_1 + \Delta P_2 + \Delta P_3$. The volumetric flow rate, Q, was assumed to be a constant at any layer of medium.

The concept of the inventive multi-layer media is that the top thickness layer serves to catch big particles and the bottom thickness layer to hold small particles. To achieve the maximum capacity it may be necessary to maintain an equal share of the terminal differential pressure on an individual layer of medium.

In summary, and as can been seen in FIG. 2 of the drawings, the present invention can provide a multi-layered filter media which can be arranged in a fluid stream flow through channel in either horizontal or vertical position or at a selected angle therebetween. As shown in FIG. 2, the novel filter media 42 is comprised of at least three successive face-to-face independent filter media selected thickness layers 17, 18 and 19 of chopped fibers. The carded, chopped fibers of each independent filter medium layers 17, 18 and 19 have a combination of fiber sizes and pore size characteristics with the carded, chopped fibers of each independent layer being substantially opened and aligned, the sizes of fibers and pore size characteristics from upstream toward downstream layers being approximately from one (1) to at least twenty (20) deniers from the upstream coarse denier layer 19 toward the downstream finer denier layer 17 with pore sizes decreasing from the coarse upstream higher denier layer toward the downstream lower finer denier layer 17. The adjacent face-to-face thickness layers are bonded by low melt fibers, in some cases by a selected acrylic binders, the carded filter media in the selected thickness layers being calculated so that the overall average pore size of the combined adjacent successive layers 17, 18 and 19 is smaller than the pore size of 'the independent finest thickness layer 17.

In accordance with the novel invention this calculation can be made by the formula:

$$\frac{1}{M} = \varepsilon_i \varepsilon_{i+1} \ldots \varepsilon_n \left( \sum_{i=1}^{n} \frac{1}{M_i} \right)$$

wherein the porosity "$\epsilon$" is the ratio of the pore volume to the total volume of medium, "$\Sigma$" is the summation from "i"=1 to n, and "M" is the mean flow pore diameter of the filter media layers and with the air frazier permeability of said three layered medium being expressed by the formula:

$$\frac{1}{v} = \varepsilon_i \varepsilon_{i+1} \ldots \varepsilon_n \left( \sum_{i=1}^{n} \frac{1}{v_i} \right)$$

wherein "v" is air frazier, fluid velocity, in cfm/square foot, the porosity, "$\epsilon$" is the ratio of the pore volume to the total volume of medium; and, "$\Sigma$" is the summation from i=1 to n.

For example, in the use of the average pore size equation for designing a multi-layer filter, such as a filter with three layers, the first and coarse or upstream layer is a commercially available product having the following properties: the mean flow pore diameter, $M_1$, is 76.9 micrometers and the porosity is 0.97. A second commercially available product which is an intermediate layer has a mean flow pore diameter, $M_2$ of 52.8 micrometers and a porosity, $\epsilon_2$ of 0.95. Thus, if we desire a final medium which is the combination of three layers to have a mean flow pore diameter M of 21.4 micrometers, then for the third or downstream layer, we assume, for example, a porosity, $\epsilon_3$, of 0.94 and calculate the main flow pore diameter of $M_3$ of 45.4 micrometers. Thus, from the aforementioned calculations the design for a maximum efficiency for a three layer filter can be obtained.

Referring to FIG. 1 of the drawings, the novel method of manufacturing the multi-layer filter media 42 comprises: collecting in a mixer-blender zone 4, the three layers of chopped fiber filter media 19, 18 and 17 in separate filter media independent selected thickness layers, each layer of filter media being of measured weight and pore size with at least one layer being of low melt fibers with the combination of fibers of one independent layer being finer than the fibers of the other independent layer fibers; passing each layer through a carding zone 6 including separate successive carding zone sections 21, 22 and 23 for each layer to open and align the fibers of each layer and to position the filter media layers 19, 18 and 17 in adjacent face-to-face relation; passing the adjacent face-to-face filter media layers 19, 18, 17 to a heating zone 7 of sufficient heat in the range of two hundred to four hundred (200° to 400°) degrees Fahrenheit to melt/bind the media layers 19, 18 and 17 in fast relation, the said carded fibers in the bonded layers 19, 18 and 17 being calculated so that the overall average pore size of the combined adjacent successive layers is smaller than the pore size of the independent finest fiber filter media layer 19 calculated by formulas above expressed including the air frazier permeability of said three layered medium being as expressed by the formula:

$$\frac{1}{v} = \varepsilon_i \varepsilon_{i+1} \ldots \varepsilon_n \left( \sum_{i=1}^{n} \frac{1}{v_i} \right)$$

wherein "v" is air frazier, fluid velocity, in cfm/square foot, the porosity, "$\epsilon$" is the ratio of the pore volume to the total volume of medium; and, "$\Sigma$" is the summation from "i"=1 to n.

Once again and as can be seen in FIG. 1A of the drawing, the novel mat 43 can be integrally formed by rearranging mixer-blenders 9, 11 and 12 in successive level alignment, pouring mats 17', 18', 19' successively and utilizing a single carding zone before passing the integrally formed mat 42' to heating zone 7.

What is claimed is:

1. A multi-layer filter media comprising a combination of at least two successive adjacent face-to-face thicknesses of selected filter fiber sizes with each thickness having fiber sizes so that the pore size characteristics of one thickness differs from that of an adjacent thickness with said fibers of one thickness being comparatively finer than said fibers of said other thickness and with the fiber sizes and pore sizes of said successive adjacent face-to-face thicknesses of fibers being calculated with an arrangement so that the overall average pore size of the combined successive thicknesses is smaller than that of the average overall pore size of that of the finest fiber thickness, whereby the average pore size of an "n" layered media is defined by the formula:

$$\frac{1}{M} = \varepsilon_i \varepsilon_{i+1} \dots \varepsilon_n \left( \sum_{i=1}^{n} \frac{1}{M_i} \right)$$

wherein the porosity of "ϵ" is the ratio of the pore volume to the total volume of medium, "Σ" is the summation from i=1 to n, and "M" is the mean flow pore diameter of the filter media layers, said multi-layer filter media having an equal share of terminal differential pressure on each of said at least two successive adjacent face-to-face thicknesses, thereby maximizing holding capacity for a predefined fluid stream.

2. The filter media of claim 1, said fibers of each thickness being carded and chopped and substantially opened and aligned.

3. The filter media of claim 1, wherein the fiber size characteristic of one thickness is less than six (6) denier and the other is at least six (6) denier.

4. The filter media of claim 1, wherein there are at least three (3) different denier fibers with the denier characteristics of each being approximately one to four (1-4), six (6) and at least twenty (20) respectively.

5. The filter media of claim 1, said combined thicknesses of filter media being integral.

6. The filter media of claim 1, said thicknesses being of separate face-to-face thicknesses.

7. The filter media of claim 6, said face-to-face layers of filter media including layer bonding means between said faces.

8. The filter media of claim 7, said fibers having low melt characteristics with said layer bonding means comprising a thermal binding.

9. The filter media of claim 7, said layer bonding means comprising a chemical binding agent.

10. The filter media of claim 9, said chemical binding agent being an acrylic binder.

11. The filter media arrangement of claim 1, wherein said successive thicknesses extend horizontally, with the upstream thickness of said combined successive thicknesses being of higher porosity and higher denier characteristics than a downstream thickness.

12. A multi-layer filter media comprising a combination of at least two successive adjacent face-to-face thicknesses of selected filter fiber sizes with each thickness having fiber sizes so that the pore size characteristics of one thickness differs from that of an adjacent thickness with said fibers of one thickness being comparatively finer than said fibers of said other thickness and with the fiber sizes and pore sizes of said successive adjacent face-to-face thicknesses of fibers being calculated with an arrangement so that the overall average pore size of the combined successive thicknesses is smaller than that of the average overall pore size of that of the finest fiber thickness, whereby the air frazier, permeability of an "n" layered media is defined by the formula:

$$\frac{1}{v} = \varepsilon_i \varepsilon_{i+1} \dots \varepsilon_n \left( \sum_{i=1}^{n} \frac{1}{v_i} \right)$$

wherein "v" is a predefined air frazier, fluid velocity, in cfm/square foot, of a known fluid stream, the porosity, "ϵ" is the ratio of the pore volume to the total volume of medium; and "Σ" is the summation from i=1 to n, said multi-layer filter media having an equal share of terminal differential pressure on each of said at least two successive adjacent face-to-face thicknesses, thereby maximizing holding capacity.

* * * * *